(12) United States Patent
Plannerer et al.

(10) Patent No.: US 7,167,545 B2
(45) Date of Patent: Jan. 23, 2007

(54) METHOD AND DEVICE FOR AUTOMATICALLY ISSUING INFORMATION USING A SEARCH ENGINE

(75) Inventors: Bernd Plannerer, Munich (DE); Michael Dahmen, Ismaning (DE); Klaus Heidenfelder, Widdern (DE); Johannes Wagner, Unterhaching (DE)

(73) Assignee: Varetis Solutions GmbH, Munich (DE)

( * ) Notice: Subject to any disclaimer, the term of this patent is extended or adjusted under 35 U.S.C. 154(b) by 40 days.

(21) Appl. No.: 10/433,888

(22) PCT Filed: Nov. 27, 2001

(86) PCT No.: PCT/EP01/13847

§ 371 (c)(1),
(2), (4) Date: Jun. 5, 2003

(87) PCT Pub. No.: WO02/46956

PCT Pub. Date: Jun. 13, 2002

(65) Prior Publication Data

US 2004/0022372 A1 Feb. 5, 2004

(30) Foreign Application Priority Data

Dec. 6, 2000 (DE) .............. 100 60 654

(51) Int. Cl.
*H04M 1/64* (2006.01)
(52) U.S. Cl. .............. 379/88.01; 704/231; 704/244; 704/250
(58) Field of Classification Search ......... 379/88.01, 379/88.02, 88.04; 704/231, 246, 261
See application file for complete search history.

(56) References Cited

U.S. PATENT DOCUMENTS

| | | | |
|---|---|---|---|
| 3,928,724 A | 12/1975 | Byram et al. | |
| 5,014,303 A | 5/1991 | Velius | |
| 5,163,083 A | 11/1992 | Dowden et al. | |
| 5,181,237 A | 1/1993 | Dowden et al. | |
| 5,185,781 A | 2/1993 | Dowden et al. | |
| 5,479,488 A | 12/1995 | Lennig et al. | |
| 5,638,425 A | 6/1997 | Meador, III et al. | |
| 5,987,408 A * | 11/1999 | Gupta ............... | 704/231 |

(Continued)

FOREIGN PATENT DOCUMENTS

DE   195 32 114   3/1997

(Continued)

*Primary Examiner*—Gerald Gauthier
(74) *Attorney, Agent, or Firm*—Jenkens & Gilchrist, P.C.

(57) ABSTRACT

Information sought, with associated attributes, is stored in the form of data records. Embodiments provide for inquiry of search arguments for several attributes stored in a data record; comparison of the input search arguments with search arguments stored; selection of a number of hits of storage search arguments corresponding to the respective input search argument, for each of the search argument inputs; weighting of the selected search arguments with scores, which weighting indicates the probability with which the respective selected stored search argument agrees with the actually input search argument; selection of suitable data records from the database via the selected number of hits; weighting of the selected data records with overall scores indicating the probability of the respective selected data record agreeing with the actually input search arguments, depending on the scores of the individual selected search arguments; and output of the data record with the highest overall score.

30 Claims, 3 Drawing Sheets

U.S. PATENT DOCUMENTS 6,026,398 A * 2/2000 Brown et al. .................. 707/5
6,122,361 A 9/2000 Gupta
6,944,283 B1 9/2005 Klein et al.

FOREIGN PATENT DOCUMENTS

| | | |
|---|---|---|
| DE | 197 52 838 | 6/1999 |
| DE | 198 19 643 | 11/1999 |
| EP | 0319140 | 6/1989 |
| GB | 2 304 957 | 3/1997 |
| WO | WO-95/28790 | 10/1995 |

* cited by examiner

| LOCALITY LIST (SCORE) | | FAMILY NAME LIST (SCORE) | | GIVEN NAME LIST (SCORE) | |
|---|---|---|---|---|---|
| MUNICH | (0.300) | MAIER | (0.200) | HORST | (0.20) |
| MÖNCHENGLADBACH | (0.010) | MÜLLER | (0.050) | HANS | (0.10) |
| MÜHLHEIM | (0.001) | MAHLER | (0.001) | HEINZ | (0.05) |

*FIG. 3*

| RECORD 1: (SCORE) | HANS 0.10 | * | MÜLLER 0.05 | * | MUNICH 0.30 | = 0.0015 |
|---|---|---|---|---|---|---|
| RECORD 2: (SCORE) | HANS 0.10 | * | MAIER 0.20 | * | MUNICH 0.30 | = 0.0060 |
| RECORD 3: (SCORE) | HORST 0.20 | * | MAIER 0.20 | * | MÖNCHENGLADBACH 0.01 | = 0.0004 |
| RECORD 4: (SCORE) | HEINZ 0.05 | * | MAIER 0.20 | * | MÖNCHENGLADBACH 0.01 | = 0.0001 |

*FIG. 4*

| (<Family name1> | OR | <Family name2> | OR | ... | <Family nameN>) | AND |
|---|---|---|---|---|---|---|
| (<Given name1> | OR | <Given name2> | OR | ... | <Given nameN>) | AND |
| (<Locality1> | OR | <Locality 2> | OR | ... | <Locality N>) | |

*FIG. 5*

| RECORD 1: (SCORE) | HANS 0.28 * | MÜLLER 0.20 * | MUNICH 0.20 | = 0.004 |
|---|---|---|---|---|
| RECORD 2: (SCORE) | HANS 0.10 * | MAIER 0.20 * | MUNICH 0.20 | = 0.004 |
| RECORD 3: (SCORE) | HANS 0.10 * | MAIER 0.20 * | MUNICH 0.20 | = 0.004 |
| RECORD 4: (SCORE) | HORST 0.20 * | MAIER 0.20 * | MÖNCHENGLADBACH 0.10 | = 0.004 |
| RECORD 5: (SCORE) | HEINZ 0.10 * | MAIER 0.20 * | MÖNCHENGLADBACH 0.10 | = 0.002 |

*FIG. 7*

METHOD AND DEVICE FOR AUTOMATICALLY ISSUING INFORMATION USING A SEARCH ENGINE

This application is a 371 of PCT/EP01/13847 Nov. 27, 2001.

BACKGROUND OF THE INVENTION

The present invention relates to a method and a device for automatically providing information by means of a search engine, in which information sought, together with other associated attributes, is stored in the form of data records.

In the field of telecommunications, large quantities of information, e.g. relating to telephone numbers of desired call partners, have to be handled. As a rule, the telephone numbers of possible call partners together with further attributes of such partners, e.g. family name, given name, company name, country, locality, postal code, street and/or house number, are stored in the search engine. Due to the multitude of possible call partners, several of these additional attributes have to be determined and interlinked in order to be able to determine the desired call partner. Up to now, this complex process has required human input in order to arrive at sensible information results.

It has already been proposed that individual steps in providing information be automated. In this context, for example printed publications U.S. Pat. Nos. 5,181,237, 5,185,781, and 5,163,083 propose that manual connection as is still common in the USA, be replaced by an automatic process for switching through. Furthermore, U.S. Pat. No. 5,014,303 describes a semi-automatic method for providing information in which search arguments entered by a caller, e.g. name, locality, etc. are first recorded and then in a compressed form are conveyed to a person providing information so as to reduce the time it takes that person. Finally, U.S. Pat. No. 5,479,488 describes a method and a device which, by means of a speech recognition device, queries various attributes of a desired call partner such as locality and name, so as to determine the telephone number of the desired call partner. In order to reduce the ambiguities generated by automatic speech recognition, the telephone number of the person seeking the information is recorded, and by means of this telephone number, the locality of the person seeking the information is determined, and subsequently, based on statistical considerations, the region to be searched for the desired call partner, i.e. the respective data quantity, is limited. This approach is however necessarily disadvantageous if call partners are sought who are outside the assumed geographic distribution rules.

SUMMARY OF THE INVENTION

It is thus the object of the present invention to create a fully-automatic method and a fully-automatic device for providing information of the type mentioned in the introduction, which method and device avoid the disadvantages of the state of the art and advantageously improve the state of the art.

The method and device of the invention alone with advantageous embodiments are described herein.

The invention is based on the recognition that an unambiguous result can be achieved with an ambiguous search inquiry to the search engine based on the limited quantity of actually existing database entries, in spite of the ambiguous inquiry.

First of all, by means of a suitable inquiry device, search arguments for several of the attributes stored in a data record can be queried by the person seeking information. In particular, search arguments such as family name, given name or company name, locality and/or street of the desired call partner can be queried, with the person seeking information inputting said search arguments by means of a suitable input device. The search arguments which have been input are then compared to predefined search arguments stored in a suitable memory. Thereafter, for each of the search arguments which have been input, a selection from, as a rule, several possible stored search arguments is made which correspond or most closely approximate the respective search argument that has been input. The selected search arguments are weighted with scores which indicate a probability with which the respective selected stored search argument agrees with the search argument which has actually been input. By means of the number of hits, which as a rule are ambiguous for the respective attribute of selected stored search arguments, suitable data records are then selected from the search engine, with the respective attributes of said suitable data records meeting the search engine inquiry. As a rule, due to the multitude of entries, there will be several of these data records. In order to arrive at an unambiguous result, weighting of the selected data record with overall scores is provided, which weighting indicates a probability of agreement between the respective selected data record and the sought data record, namely depending on the scores of the individual search arguments according to the selected number of hits. Finally, by means of a suitable output device, one or several data record(s) is/are output to the person seeking the information. The selection of the data records to be output takes place by means of the overall scores, i.e. the probability of said data records agreeing with the sought data record.

An improvement of the invention provides for a speech recognition device by means of which querying of the search arguments is carried out phonetically. The respective person seeking the information speaks the attributes such as e.g. family name, given name, street and locality of the desired call partner into the input device. The speech recognition device then converts this spoken information to suitable data which can be compared to the corresponding stored search arguments. Speech recognition offers big advantages, in particular when providing information in the telecommunications field, since usually the desired telephone number is asked for by means of the telephone.

Querying the search arguments to be entered can take place in various ways. For example it is possible by way of display control, e-mail and the like. However, the above-mentioned type of inquiry has particular advantages by means of a speech recognition device.

In an improvement of the invention, inquiry of the search arguments is carried out step by step with the use of dialog control. In particular, following the issue of a corresponding request, the search argument for each attribute of the sought data record, e.g. family name, given name, locality and street of the desired call partner is queried separately. Recognition of the search arguments from freely spoken text is also possible.

Allocation of one or several stored search arguments to the actually entered search argument can take place in various ways. An improvement of the invention provides for partitioning and dividing the relevant stored information with which the entered search arguments are compared. In particular, the stored search arguments for the individual attributes are stored in respective separate directories. In particular, a family name directory, a given name directory, a locality directory and/or a street name directory can be provided.

The comparison between entered and stored search arguments is then carried out only on the basis of the relevant directory, of which in each given case there is one. This considerably simplifies and accelerates the comparison procedure since in each case only a smaller quantity of data needs to be compared. Furthermore, better recognition quality and thus better hit probability can be achieved as only relevant stored search arguments can be allocated.

In an improvement of the invention, the search arguments which have been selected and allocated to an entered search argument from the search argument memory are weighted with an absolute score. Preferably, inquiry, comparison and weighting concerning a search argument can be repeated if the allocated absolute score would lie outside a specified score range. This can be provided at least in situations where, in relation to an attribute, the score of none of the selected search arguments is within the predefined value region, that is to say, if the probability of a hit is not adequate in any of the selected search arguments for an attribute.

In order to determine the data records which can correspond to the search inquiry, a different approach can be taken. Preferably, first the data records are selected in which all attributes meet the fuzzy search inquiry, i.e. if they contain the attributes which correspond to one of the search arguments of each number of hits of the selected search arguments. To this effect, querying the search engine is carried out in such a way that the several selected search arguments for the same attribute are subjected to an OR operation and the various numbers of hits of the search arguments for various attributes are subjected to an AND operation.

However, if no data record is found which contains all the queried attributes, then that data record can be selected which has the highest number of attributes that correspond to the query.

If too many data records are found, the list can be limited by querying further attributes. To this effect, the directories of the recognition device are preferably reduced dynamically to the number of attribute values of the data records found; this significantly increases the hit probability.

The overall scores of the selected data records can be calculated in various ways. The corresponding calculation device of the system can be configured such that the overall scores are determined by multiplying the individual scores which were allocated to the attributes of the respective data record or to the respective search arguments. However, other calculation methods are also possible. In particular, different weighting of the individual scores for calculating the overall score can take place.

In order to reduce the complexity of the query, parts of the search inquiry can be unambiguously confirmed by the person seeking information, by way of checking in the dialog. Instead of a multitude of selected search arguments, it is then possible, for the respective attribute, to accommodate a single search argument in the search request to the search engine.

Preferably, the data record determined is output by automatic announcement. Here, for example a computer-assisted announcement unit, which is known per se, can be used, with which in telephone information systems the desired telephone numbers are announced. Output via SMS, e-mail, fax etc. is also possible.

BRIEF DESCRIPTION OF THE DRAWINGS

Below, the invention is explained in more detail by means of a preferred embodiment and associated drawings. The drawings show the following:

FIG. 3 A hit list of selected search arguments for a search example;

FIG. 4 A list of selected data records for the search example according to FIG. 3;

FIG. 5 A query to the search engine, which query has been generated from the number of hits;

FIG. 7 A list of data records found from which no data record can be unambiguously selected.

DESCRIPTION OF THE PREFERRED EMBODIMENTS

Figure 1:
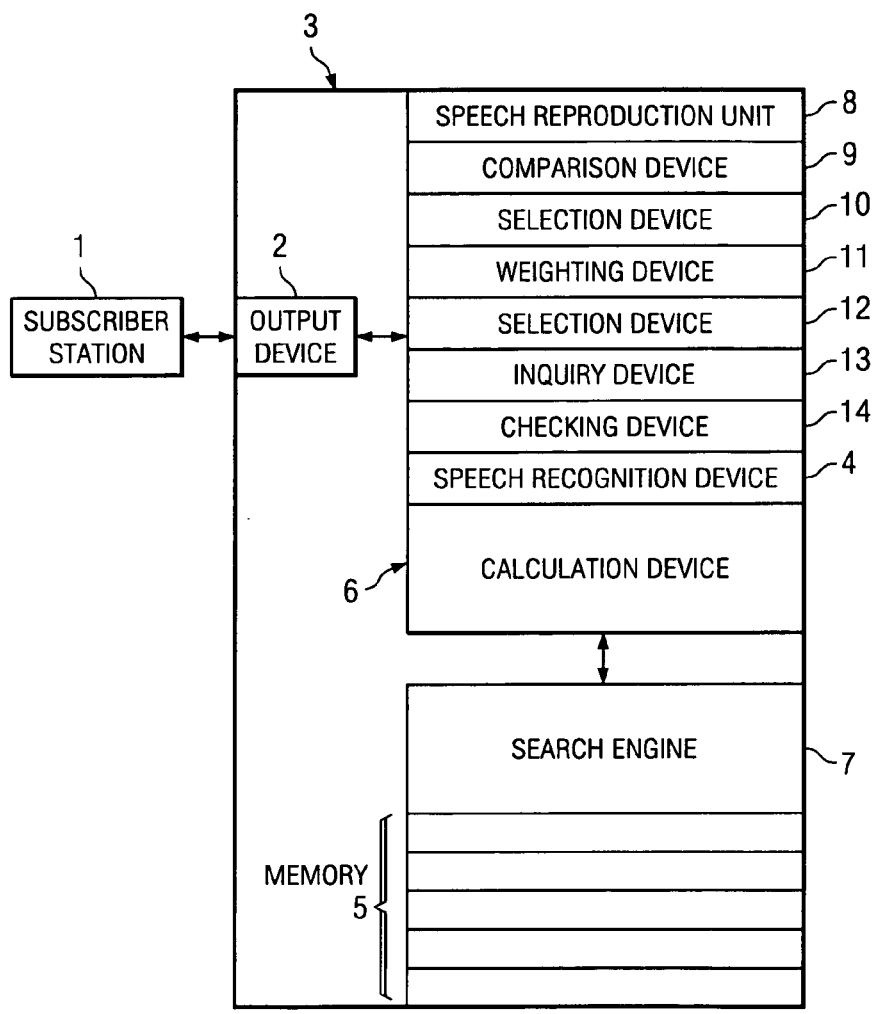
FIG. 1 A diagrammatic representation of a device for automatically providing information, according to a preferred embodiment of the invention.

Below, a telephone number information system according to an advantageous embodiment of the invention is explained by explaining a search for private subscribers. However, it goes without saying that a search for companies or authorities is also possible. The difference is in the number of search fields, because e.g. there is no given name, and furthermore in the increase in size in the name lists of the directories of the speech recognition device.

An incoming call from a subscriber station 1 is first accepted at the input-output device 2 which forms a telephone interface of the system. The information system 3 commences an automatic dialog with the caller to the subscriber station 1. In this dialog, the system records the individual search arguments such as e.g. family name, given name and locality of the desired call partner, and sends the spoken input to the speech recognition device 4.

First, a greeting message, if required with a brief explanation of the system, can be sent out, followed by a request to speak the locality of the desired call partner. The caller then speaks the locality of the desired call partner. This is recorded by the system and sent to the speech recognition device 4, which, from a memory 5 containing localities, then selects localities that most closely approximate the locality of the spoken locality. For this purpose, the memory 5 comprises a locality directory which stores possible localities of possible call partners. As a result of speech recognition, the speech recognition device 4 determines a word list with a number N of the most probable recognition results. The number N is a settable parameter which represents an important configuration option of the information system. In addition, the speech recognition device 4 determines a score for each of the recognition results, with said score indicating the probability with which the selected locality agrees with the actually spoken locality.

The steps: request for input, input by the person seeking information by speaking, as well as recognition of the spoken input by the speech recognition device 4 with determination of the hit list as a result with scores are subsequently repeated for all further search arguments. In the embodiment shown these are the family name as well as the given name of the desired call partner. Attributes which are not known to the person seeking information may be left out.

When the score of the recognition result of the speech recognition device 4 for the individual attributes is below a threshold value, the procedure can be repeated for this attribute. If recognition fails repeatedly, spelling recognition may be used if necessary.

For certain arguments it may be sensible to have the system confirm names which have been recognised by the speech recognition device 4 to the person seeking information. In this way the complexity of the subsequent search engine search is reduced.

Figure 2:
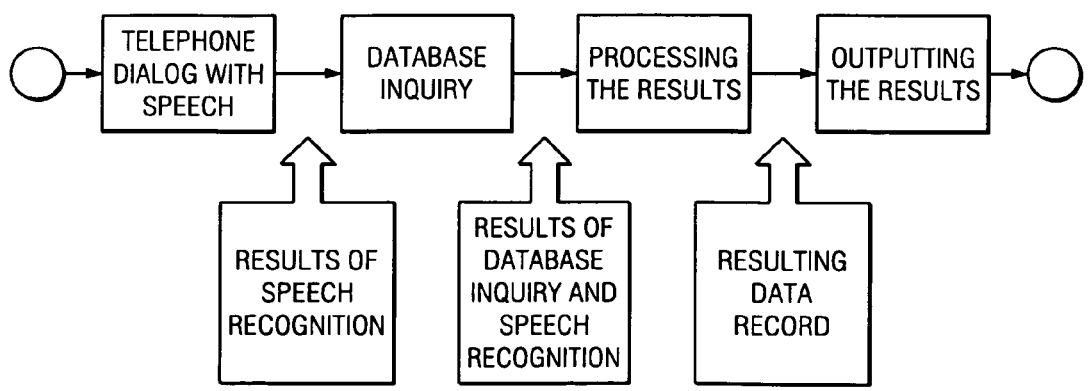
FIG. 2 A functional diagram which shows the sequence of providing automatic information.

At the end of the automatic dialog (FIG. 2) there are then several hit lists of the search arguments selected for the respective search attributes. If e.g. the search relates to a call partner "Hans Maier of Munich", and the number N of the recognition-results to be accommodated in the list is N=3, the hit lists as shown in FIG. 3 may result. In the figure, the scores for the respective hits are shown in brackets behind the hits.

The computer device 6 of the information system 3 then generates an enquiry to the search engine which contains the data records with the desired telephone numbers. In FIG. 1, this search engine has the designation 7. Said search engine does not necessarily form an integral part of the system, but in the present embodiment it is shown as such.

The query to the search engine 7 contains all the elements of the hit lists which are combined with logic AND and OR operations, with all possible combinations of the selected search arguments being permuted. Thus, the resulting inquiry has the form shown in FIG. 5.

Preferably, speech recognition is undertaken such that a hit is allocated to each search argument input, even if no identical entry can be detected in the corresponding directory. A search in the directory is made for the word which most closely approximates the sound. In this way, 100% mapping of the entered search argument to the stored search arguments is obtained even in the case of a dictionary which does not contain words that rarely occur. This results in corresponding weighting of the hits found by the respective score.

The computer device 6 then sends the generated search machine request to the search engine 7 and selects all the data records which meet the search inquiry. After this, a list of the selected data records is prepared. In the search result shown in FIG. 4, a search engine enquiry of all possible combinations returned 4 existing entries. The search engine request was met by the entries "Hans Müller, Munich", "Hans Maier, Munich", "Horst Maier, Mönchengladbach" and "Heinz Maier, Mönchengladbach". Due to the fuzzy search engine inquiry, a result which is not unambiguous was thus obtained. This result is then analysed in a subsequent evaluation step or in a subsequent processing step.

During this subsequent processing step, possible errors or inaccuracies during the speech recognition procedure can be compensated for by comparison or calculation with the data from the existing data holdings. If e.g. a name which has been classified by the speech recognition device as having been "very well recognised" does not exist in the search engine or does not exist therein in conjunction with the further attributes, then it can be assumed that this recognition result was nevertheless not the correct one. In this case, the second-best result may for example apply.

To this effect, an overall score for the four determined data records is calculated, said overall score being shown in the right column of FIG. 4. The scores which were allocated by the speech recognition device 4 to the individual attributes of each data record or to the correspondingly selected search arguments, are multiplied with one another so that in the example of data record 1, the overall score is arrived from the product of the individual scores 0.1 and 0.05 and 0.3, namely an overall score of 0.0015. In the embodiment shown, weighting of the individual scores by additional factors does not take place. It is, however, quite possible to place greater weighting on the scores for individual attributes, e.g. for the family name.

In the embodiment shown according to FIG. 4, the resulting data record no. 2 is the data record with the highest overall score, namely 0.006. From this, the information system 3 deduces that with very high probability this is the desired entry. The information system 3 determines this although the given name "Hans" is not the best name from the list of given names which has been prepared by the speech recognition device 4.

Figures 6, 8:
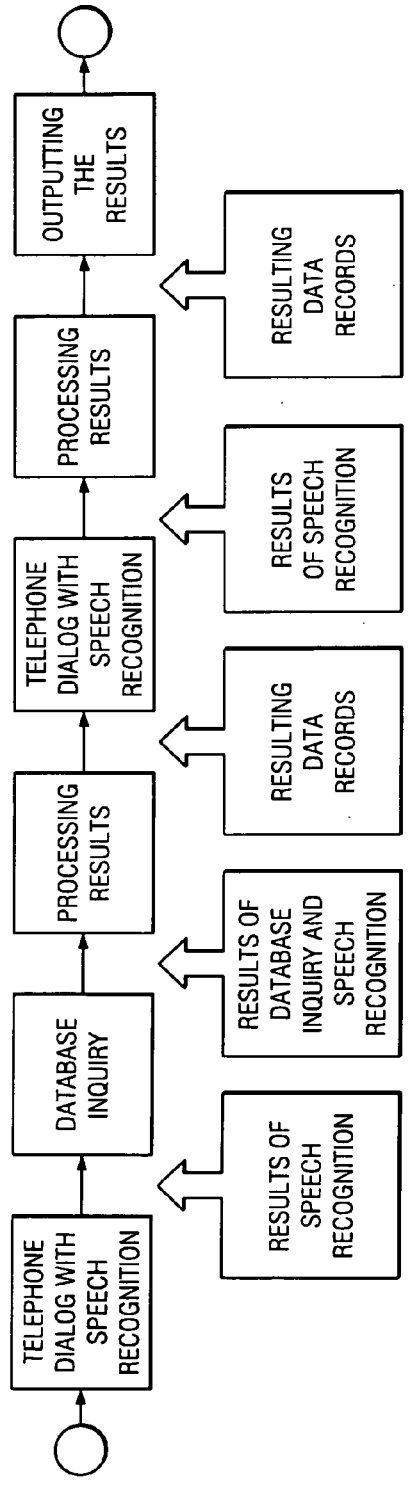
FIG. 6 A functional diagram which shows the sequence of automatically providing information in the case of too many data records being found.
FIG. 8 A list of data records found with an additional attribute which makes an unambiguous selection possible.

A further example explains the treatment when too many data records have been found (FIG. 6):

During subsequent processing, several data records with almost the same score may result so that no clearly preferred data record can be selected for output. This is shown as an example in FIG. 7. In this case, a further attribute, in the present case the street name, is queried. For this purpose, the directory of the recognition device, which directory is required for this, is established during the run-time, from all street names of the data records already found. In the present example these are the street names Leopoldstrasse, Maximilianstrasse, Grillparzerstrasse, Hauptstrase and Bahnhofstrasse (compare FIG. 8). This additional inquiry and recognition of the street name makes it possible to determine an additional attribute with weighting factor for calculating the overall score. In this way, the recognition quality of the overall system is drastically improved. In the example according to FIG. 8, the data record "Hans Maier, Maximilianstrasse, Munich" is output.

The invention claimed is:

1. A method for automatically providing information via a search engine, the method comprising:
   receiving search arguments for a plurality of attributes stored in a data record, the plurality attributes comprising a name and a location of a searched object;
   comparing of the received search arguments with stored search arguments;
   for each of the received search arguments, selecting at least one of stored search argument hit that approximates the received search argument;
   weighting the at least one selected search argument hit;
   wherein each weight indicates a probability that a selected stored search argument agrees with a respective received search argument;
   selecting data records from the stored data records using the selected at least one search argument hit;
   weighting the selected data records with overall scores indicating a probability of a respective selected data record agreeing with the received search arguments; and
   wherein the overall scores depend on the scores of the at least one selected search argument hit.

2. The method according to claim 1, wherein the step of receiving the search arguments comprises speech recognition.

3. The method according to claim 1, wherein the step of receiving the search arguments takes place step-by-step for each attribute separately.

4. The method according to claim 1, wherein:
a plurality of separate quantities of stored search arguments are provided according to various types of attributes; and
the step of comparing the received and stored search arguments for a respectively received search argument in each instance is carried out on the basis of only one of the quantities of stored search arguments.

5. The method according to claim 1, wherein the step of selecting data records comprises selecting data records that contain attributes that correspond to one of the search arguments of each of the at least one search argument hit.

6. The method according to claim 1, wherein the step of selecting data records comprises selecting data records that comprise the largest number of attributes that correspond to a respective search argument of each of the at least one search argument hit.

7. The method according to claim 1, wherein:
the overall scores are determined by multiplying individual scores allocated to the attributes of respective search arguments; and
the individual scores for attributes of the respective search arguments are weighted individually.

8. The method according to claim 1, wherein:
for selected search arguments for at least one of the attributes a check is generated which reproduces the selected search argument for a respective attribute with the best score; and
a number of hits of the selected search arguments for the respective at least one attribute during confirmation of the check is limited to the search argument with the best score.

9. The method according to claim 1, further comprising:
outputting the data record with the highest overall score; and announcing a telephone number corresponding to the output data record.

10. The method according to claim 1, wherein the name is weighted, the location is weighted, and the weights of the name and location are multiplied to calculate the overall score.

11. The method of claim 1, further comprising outputting the data record with the highest overall score.

12. The method according to claim 11, wherein output of the data record takes place acoustically via a speech reproduction unit.

13. The method according to claim 11, wherein a plurality of data records are output according to their overall scores.

14. The method according to claim 13, wherein:
the step of selecting a data record comprises querying a further attribute; and
an entered search argument of the Queried attribute is only compared to attribute values of the data records already selected.

15. The method according to claim 11, wherein the steps are carried out with a single search engine to automatically output a single data record with highest overall score.

16. A method for automatically providing information by means of a search engine, in which information sought, together with other associated attributes, is stored in the form of data records, involving the following steps:
inquiry of search arguments for several attributes stored in the data record;
comparison of the search arguments which have been input with search arguments stored;
selection of a number of hits of stored search arguments which correspond to, or most closely approximate, the respective search argument that has been input, for each of the search arguments input;
weighting of the selected search arguments with scores, which weighting indicates the probability with which the respective selected stored search argument agrees with the actually input search argument;
selection of suitable data records from the stored data records by means of the selected number of hits;
weighting of the selected data records with overall scores which indicate the probability of the respective selected data record agreeing with the actually input search arguments, depending on the scores of the individual selected search arguments; and
output of the data record with the highest overall, wherein the search arguments which have been selected are weighted with absolute scores, wherein, preferably, a score is specified and if the scores are outside this score range, steps a) to d) are repeated in relation to the respective search argument.

17. A device for automatically providing information via a search engine the method comprising
an input device for inputting search arguments for a plurality of attributes stored in a data record;
wherein the plurality of attributes include a name and a location of a searched object;
a comparison device for comparing the input search arguments with stored search arguments;
a selection device for selecting at least one stored search argument hit that approximates an input search argument for each of the input search arguments that have been input;
a weighting device for weighting the selected at least one search argument hit;
wherein each weight indicates a probability a selected stored search argument agrees with a respective input search argument;
a selection device for selecting data records from the stored data records using the at least one search argument hit;
a calculation device for calculating overall scores for the selected data records indicating a probability of the a respective selected data record agreeing with the input search arguments; and
wherein the overall scores depend on the scores of the at least one selected search argument hit.

18. The device according to claim 17, further comprising a speech recognition device for speech recognition of spoken input search arguments.

19. The device according to claim 17, further comprising an inquiry device configured such that the input search arguments are queried step-by-step for each attribute separately.

20. The device according to claim 17, further comprising:
a memory connectable to the speech recognition device
wherein several separate quantities of stored search arguments are stored in the memory according to various types of attributes;
wherein the comparison device is configured such that a comparison between an input and a stored search argument for a respectively input search argument is carried out on the basis of only one of the quantities of stored search arguments.

21. The device according to claim 17, wherein the weighting device is designed such that absolute scores are allocated to the selected at least one search argument.

22. The device according to claim 17, wherein the selection device is configured to select data records that contain attributes that correspond to one of the search arguments of each of the at least one search argument hit.

23. The device according to claim 17, wherein the selection device is configured to select data records that comprise the largest number of attributes that correspond to a respective search argument of at least one search argument hit.

24. The device according to claim 17, wherein:
the calculation device is configured such that the overall scores are determined by multiplying individual scores allocated to attributes of respective search arguments; and
the calculation device configured such that scores for attributes are weighted individually.

25. The device according to claim 17, further comprising: a checking device for generating a check, which in relation to a group of selected search arguments, returns the search argument with the best score;
wherein the selection device is configured such that during confirmation of the check the at least one search argument hit is limited to the search argument with the best score.

26. The device according to claim 17, further comprising an output device comprising a speech reproduction unit for acoustic output.

27. The device according to claim 17, wherein the device is adapted to operate as a telephone-number information system.

28. The device according to claim 17, wherein the device is adapted to access a single search engine and output a single data record with a highest overall score.

29. The device according to claim 17, wherein the weighting device weights the name, separately weights the location, and the calculation device multiplies the weights of the name and location to calculate the overall score.

30. A computer program product comprising program code, stored on a computer-readable data carrier, for implementing the following steps;
receiving search arguments for a plurality of attributes stored in a data record, the plurality of attributes comprising a name and a location of a searched object;
comparing the received search arguments with stored search arguments;
for each of the received search arguments, selecting at least one stored search argument; hit that approximates the received search argument;
weighting the at least one selected search argument hit;
wherein each weight indicates a probability that a selected stored search argument agrees with a respective received search argument;
selecting data records from the stored data records using the selected at least one search argument hit;
weighting the selected data records with overall scores indicating a probability of a respective selected data record agreeing with the received search arguments; and
wherein the overall scores depend on the scores of the at least one selected search.

* * * * *

UNITED STATES PATENT AND TRADEMARK OFFICE
CERTIFICATE OF CORRECTION

PATENT NO. : 7,167,545 B2  Page 1 of 1
APPLICATION NO. : 10/433888
DATED : January 23, 2007
INVENTOR(S) : Bernd Plannerer et al.

It is certified that error appears in the above-identified patent and that said Letters Patent is hereby corrected as shown below:

Column 1, Line 61
Replace     "alone"
With        -- along --

Column 7, Claim 7, Line 20
Delete      the word -- the -- before the word "attributes"

Column 7, Claim 8, Line 26
Insert      -- , -- after the word "attributes"

Column 8, Claim 17, Lines 30 - 31
Delete      "that have been input" after the word "argument"

Column 10, Claim 30, Line 7
Replace     ";" after step
With        -- : --

Column 10, Claim 30, Line 14
Delete      ";" between the words "argument" and "hit"

Signed and Sealed this

Thirtieth Day of December, 2008

JON W. DUDAS
*Director of the United States Patent and Trademark Office*